(12) United States Patent
Edlund

(10) Patent No.: US 7,984,432 B2
(45) Date of Patent: Jul. 19, 2011

(54) METHOD FOR PATCHING A READ-ONLY MEMORY AND A DATA PROCESSING SYSTEM COMPRISING A MEANS OF PATCHING THE READ-ONLY MEMORY BASED ON PATCH CONTEXTS

(75) Inventor: Mattias Edlund, Märsta (SE)

(73) Assignee: Infineon Technologies AG, Munich (DE)

( * ) Notice: Subject to any disclaimer, the term of this patent is extended or adjusted under 35 U.S.C. 154(b) by 1369 days.

(21) Appl. No.: 11/442,808

(22) Filed: May 30, 2006

(65) Prior Publication Data

US 2007/0294599 A1    Dec. 20, 2007

(51) Int. Cl.
*G06F 9/44* (2006.01)
*G06F 9/45* (2006.01)

(52) U.S. Cl. .......................... 717/168; 717/174; 709/203
(58) Field of Classification Search .......... 717/168–174; 709/203–204
See application file for complete search history.

(56) References Cited

U.S. PATENT DOCUMENTS

| | | | |
|---|---|---|---|
| 4,831,517 A * | 5/1989 | Crouse et al. ........................ 714/8 |
| 5,757,690 A * | 5/1998 | McMahon ....................... 365/104 |
| 6,073,252 A * | 6/2000 | Moyer et al. ......................... 714/7 |
| 6,453,469 B1 * | 9/2002 | Jystad ............................. 717/174 |
| 6,578,142 B1 * | 6/2003 | Anderson et al. .................... 713/2 |
| 6,802,061 B1 * | 10/2004 | Parthasarathy et al. ........ 717/173 |
| 6,807,558 B1 * | 10/2004 | Hassett et al. .................. 709/203 |
| 6,931,477 B2 * | 8/2005 | Oakley et al. ....................... 711/2 |
| 7,107,439 B2 * | 9/2006 | Risucci ........................... 712/244 |
| 7,127,712 B1 * | 10/2006 | Noble et al. .................... 717/173 |
| 7,290,244 B2 * | 10/2007 | Peck et al. ...................... 717/109 |
| 7,305,672 B2 * | 12/2007 | Vincent .......................... 717/172 |
| 7,343,599 B2 * | 3/2008 | Panjwani ....................... 717/168 |
| 7,415,705 B2 * | 8/2008 | DeWitt et al. .................. 717/168 |
| 7,509,480 B2 * | 3/2009 | Jensen et al. ..................... 712/43 |
| 7,552,430 B2 * | 6/2009 | Napier et al. .................. 717/169 |
| 7,552,431 B2 * | 6/2009 | Napier et al. .................. 717/169 |
| 7,603,669 B2 * | 10/2009 | Curtis et al. ................... 717/174 |
| 7,653,687 B2 * | 1/2010 | Reisman ....................... 709/203 |
| 7,676,806 B2 * | 3/2010 | Curtis et al. ................... 717/177 |
| 7,784,044 B2 * | 8/2010 | Buban et al. ................... 717/168 |
| 7,802,246 B1 * | 9/2010 | Kennedy et al. .............. 717/173 |
| 7,809,791 B2 * | 10/2010 | Schwartz et al. ............. 709/204 |
| 7,818,736 B2 * | 10/2010 | Appavoo et al. .............. 717/168 |
| 7,870,550 B1 * | 1/2011 | Qureshi et al. ................ 717/174 |
| 7,873,959 B2 * | 1/2011 | Zhu et al. ..................... 717/172 |

OTHER PUBLICATIONS

Gao et al, "First aid: surviving and preventing memory management bugs during production runs", ACM EuroSys, pp. 159-172, 2009.*
Novark et al, "Exterminator: automatically correcting memory errors with high probability", Comm. of the ACM, vol. 51, No. 2, pp. 87-95, 2008.*

(Continued)

*Primary Examiner* — Anil Khatri
(74) *Attorney, Agent, or Firm* — Eschweiler & Associates, LLC

(57) ABSTRACT

A method for patching a read-only memory (ROM) includes providing multiple patch contexts in a patch contexts memory, with the ROM providing information for a data processing system. Each patch context defines a different set of patches, with each patch comprising a patch address and corresponding patch data. The patch contexts are activated one at a time. Each time the information is patched according to the currently activated patch context.

3 Claims, 3 Drawing Sheets

OTHER PUBLICATIONS

Baker et al, "Rotationally invariant sparse patch matching on GPU and FPGA", IEEE, pp. 1-8, 2008.*

Xiao et al, "Fast exact nearest patch matching for patch based image editiing and processing", IEEE, vol. 6, No. 1, pp. 1-14, 2007.*

Kim et al, "Remote progressive framework update for flash based networked embedded systems", ACM ISLPED, pp. 407-412, 2009.*

Wagner et al, "CASPAR: Hardware patching for multi-core processors", ACM EDAA, pp. 658-663, 2009.*

* cited by examiner

FIG 1
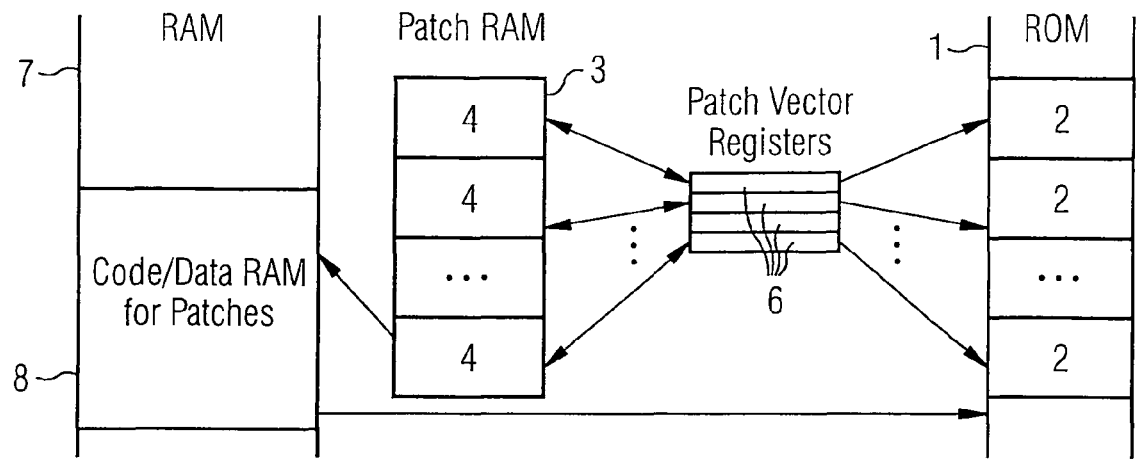
FIG 2
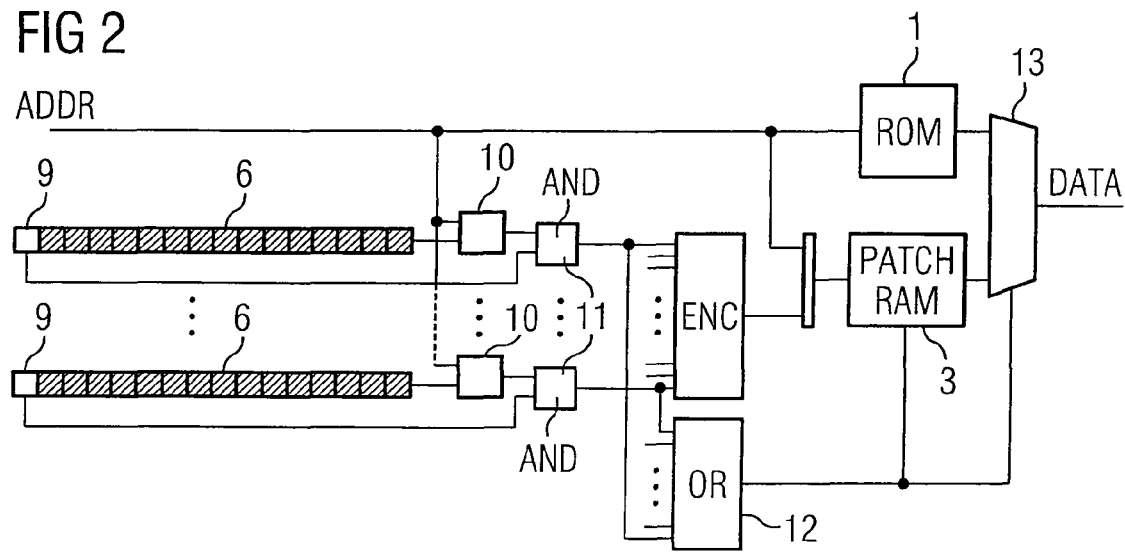
FIG 3

US 7,984,432 B2

METHOD FOR PATCHING A READ-ONLY MEMORY AND A DATA PROCESSING SYSTEM COMPRISING A MEANS OF PATCHING THE READ-ONLY MEMORY BASED ON PATCH CONTEXTS

FIELD OF THE INVENTION

The invention relates to a method for patching a read-only memory (ROM) and data processing system comprising a means of patching the ROM.

BACKGROUND OF THE INVENTION

In data processing systems, especially in a complex baseband chip of a wireless transceiver, frequently a ROM is used to store code and data, in particular to store the firmware of the system or parts thereof. In case of a baseband chip the ROM is frequently integrated on the baseband chip. Often there is a need to update the information in the ROM. Reasons for updating are the need to fix bugs in code and/or data in the ROM or the need to include new or custom functions. Since the information in the ROM is mask-programmed, the information is fixed and cannot be directly updated without modifying the fabrication masks of the ROM or the complete baseband chip in case of an integrated ROM. Additionally, an update of an already fabricated ROM by directly rewriting the fabricated ROM is not possible.

Conventionally, the information on the ROM is updated by patching those blocks of the ROM which need to be updated. According to conventional ROM patching techniques patches, updated blocks of information and the corresponding patch addresses, are loaded in a patch hardware, containing a patch RAM (random access memory) for storing the updated blocks and a set of address registers for storing the patch addresses. In case one of those patch addresses in the ROM is addressed during operation, the patched block in the patch RAM is read instead of the original block in the ROM. Thus, the patch hardware works as cache. The patching capability of this conventional cache-like technique is limited according to the maximum number of patches to load.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present one or more concepts of the invention in a simplified form as a prelude to the more detailed description that is presented later.

In accordance with one embodiment of the invention, a method for patching a ROM, with the ROM providing information for a data processing system, includes providing multiple patch contexts in a patch contexts memory. Each patch context defines a different set of patches, with each patch comprising a patch address and corresponding patch data. The patch contexts are activated one at a time. Each time the information is patched according to the currently activated patch context.

In another embodiment of the invention, a data processing system comprises a ROM, providing information for the data processing system. The system further includes a patch contexts memory, providing multiple patch contexts. The system comprises a means for patching the ROM. The means is configured to activate the patch contexts one at a time. Each time the information is patched according to the currently activated patch context.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, how-ever, of but a few of the various ways in which the principles of the invention may be employed. Other objects, advantages and novel features of the invention will be-come apparent from the following detailed description of the invention when considered in conjunction with the drawings.

BRIEF DESCRIPTION OF THE DRAWINGS

Embodiments of the invention are better understood with reference to the following drawings.

FIG. 1 is a diagram illustrating a conventional ROM patching technique;

FIG. 2 is a circuit diagram illustrating an embodiment of the patch hardware;

FIG. 3 is an exemplary flow chart illustrating an embodiment of the inventive method in an exemplary case of sequential code;

DETAILED DESCRIPTION OF THE INVENTION

Figure 4:
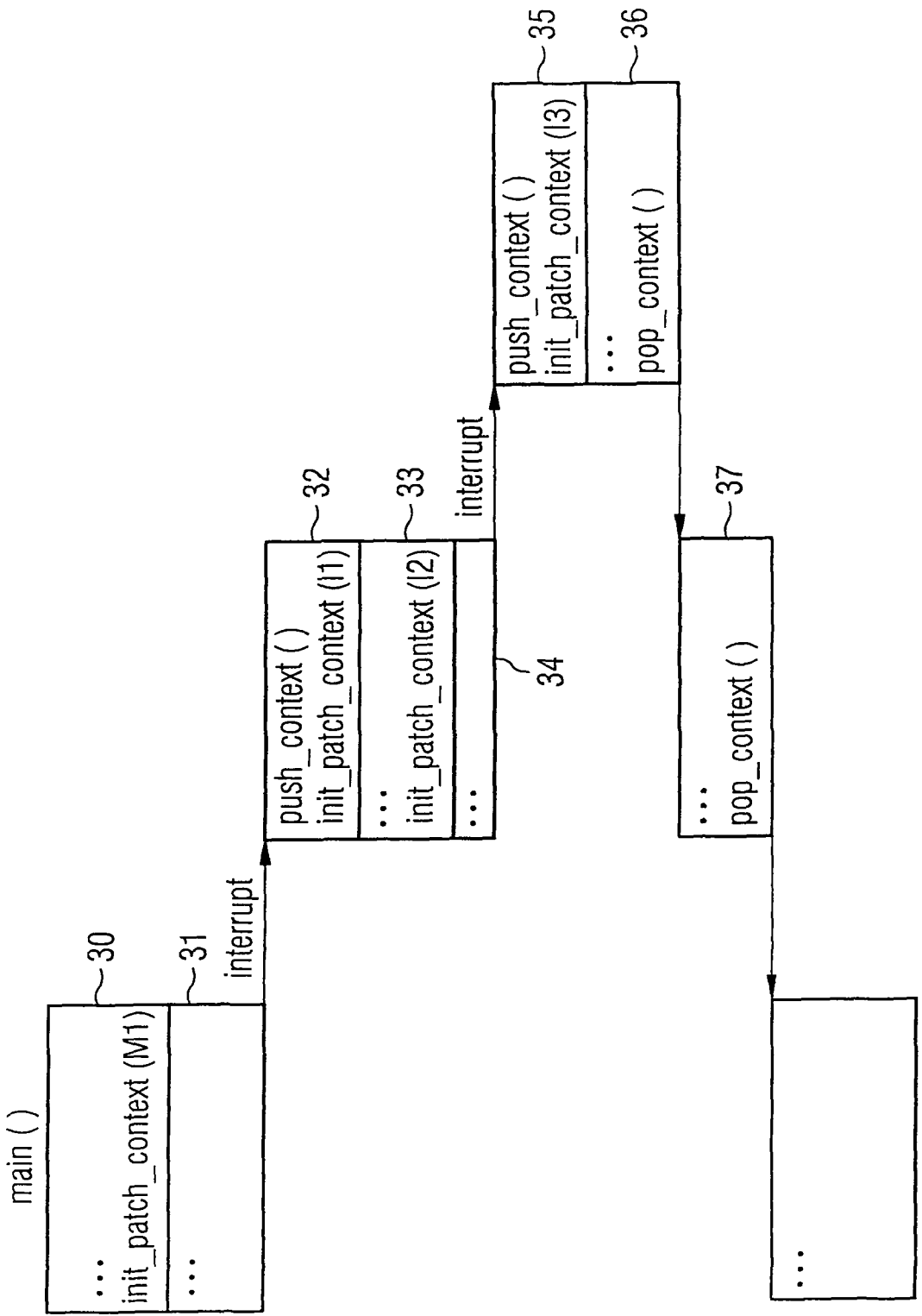
FIG. 4 is an exemplary flow chart illustrating an embodiment of the inventive method with two levels of interrupts.

FIG. 1 is a diagram illustrating a conventional ROM patching technique to apply patches to information, in particular to firmware, stored in a ROM 1. The information in the ROM 1 may contain code and data for a processor (not shown), e.g. an ARM-type processor as part of a baseband chip (e.g. for the Bluetooth standard). The ROM 1 is subdivided into blocks 2. Further, as a part of the patch hardware a patch RAM 3 is provided, which is subdivided in a number of N patch blocks 4, with the size of the patch blocks 4 and the size of blocks 2 in the ROM 1 being the same and the number N of patch blocks 4 of the patch RAM 3 being typically considerably smaller than the number of blocks 2 of the ROM 1. In addition to the patch RAM 3, a set of address registers 6 (patch vector registers) is employed in the patch hardware, with each address register 6 being assigned to one patch block 4.

For updating the ROM 1 a number of M patches (M≦N), i.e. updated blocks of information and its corresponding patch addresses (patch vectors), are loaded in the patch blocks 4 of the patch RAM 3 and in the address registers 6. The loaded patch addresses in the registers 6 define addresses of the blocks 2 in the ROM 1 to be patched. In case one of those patch addresses in the ROM 1 is addressed during operation, the corresponding patch block 4 of the patch RAM 3 is read instead of the original block 2 in the ROM 1. In addition, branch instructions may be included in an updated patch block (c.f. the last patch block 4 in FIG. 1), that branch from the patch block 4 to a patch dedicated portion 8 of a RAM 7. The patch dedicated portion 8 of the RAM 7 contains additional code or data, which does not fit into a small size patch block 4. The patch RAM 3, the address registers 6 and the patch dedicated portion 8 of the RAM 7 are initialized once when the patches are loaded (typically from a host through an interface, i.e. through an UART (Universal Asynchronous Receiver Transmitter), or from a non-volatile memory, i.e. from a flash-memory). The number of patches that can be applied is limited by the number N of patch blocks 4 and registers 6. Also, the amount of RAM 8 reserved for patches limits the amount of additional code/data, which could be included in the firmware during patching. Nevertheless, in practice the patching capability is mostly limited by the number N of patch blocks 4 and registers 6.

In case the number of blocks to update exceeds the limit N of patch blocks 4 and registers 6, conventionally the least important patches have to be removed or a new ROM mask has to be fabricated. Alternatively, custom groups of patches (with a number of patches ≦N) for each customer with different functionality have to be provided.

FIG. 2 is a circuit diagram illustrating an exemplary embodiment of the patch hardware, which is employed in accordance with the invention. Like reference numerals in FIG. 1 und FIG. 2 designate corresponding similar parts. Each loaded patch vector register 6 of the total number of N (e.g. N=32) registers contains a valid bit 9 and the most significant bits of the start address of the block 2 in the ROM 1 to be patched. The valid bit signals whether the corresponding patch is active or not. The most significant bits of the ROM address signal ADDR is continually compared to the patch vectors stored in the patch vector registers 6 by means of XNOR-gates 10. If a match at the output of one XNOR-gate 10 is signaled and the corresponding valid bit 9 in the patch vector register 9 is set (which is verified via the corresponding AND-gate 11), the patch RAM is enabled and selected via the output of the OR-gate 12 and the selector 13. Thus, the data is read from patch RAM 3 instead of from the ROM 1.

The blocks start at block aligned addresses (e.g. 0, 16, 32, . . . , for a patch block size of 16 bytes). In worst case it may be necessary to use two blocks to patch two adjacent bytes, e.g. if the bytes are at the addresses 15 and 16.

In addition to the patch hardware, described above, a portion 8 of the firmware RAM 7 (c.f. FIG. 1) can be reserved for additional patch code or data. Thus, the patch blocks can be used to insert branch instructions that branch to the patch dedicated portion 8 of the RAM 7, where the main parts of the patches reside.

It should be noted, that the patch RAM can be implemented either as a separate RAM (as shown in FIG. 2) or as a portion of the firmware RAM 7.

According to one embodiment of the invention, the patch hardware is reused with different content in different contexts. For this, multiple patch contexts are provided in a patch contexts memory, with each patch context defining a different set of patches, being active at the same time. Each set of patches does not exceed the number N of registers 6 of the patch hardware. According to one embodiment of the invention, the patch contexts are stored in the RAM 7, i.e. in this case the patch contexts memory is part of the RAM 7. The different patch contexts are activated one at a time by the firmware when needed. For activating a patch context, the patch context is copied from the RAM 7 to the patch hardware shown in FIG. 2, i.e. to the registers 6 and the patch RAM 3. The currently activated patch context overwrites at least partly the previously stored patch context in the patch hardware, with the previously stored patch context being deactivated. Each time the information in the ROM 1 is patched according to the currently activated patch context and the data processing in the processor (not shown) is modified according to current ROM patching. The successive activation of the patch contexts is controlled by means of the patched firmware. For this, a previously activated patch context, modifying the firmware in the ROM, comprises a patch for activating a patch context, succeeding the previously activated patch.

Since the different patch contexts are activated one at a time, the inventive concept makes it possible to implement a theoretically unlimited total number of patches with a limited number N (here: N=32) of patch blocks 3 in the patch RAM 4 and patch vector registers 6. The total number of patches is limited only by the amount of RAM 7, reserved for the patch contexts. It should be noted that the number of patches, being active at the same time, is still limited to the number N.

FIG. 3 is an exemplary flow chart illustrating an embodiment of the inventive method in an exemplary case of sequential firmware code with three successively activated patch contexts. Here, the patch contexts are activated one after another, with one patch in one patch context being used to activate the succeeding patch context. The function "init_patch_context (context_identifier)" activates a patch context by copying it from the RAM 7 to the patch hardware. In step 20 the first patch context M1 is activated by the instruction "init_patch_context (M1)", which is patched prior to the existing system. Subsequent to step 20, the processor executes instruction code, which is modified according to the first patch context M1. The first patch context M1 also comprises a patch for including an instruction "init_patch_context (M2)" in the firmware code to activate the second patch context M2 (c.f. step 22). Subsequent to step 22, the processor executes instruction code, which is modified according to the second patch context M2. The second patch context M2 also comprises a patch for including an instruction "init_patch_context (M3)" to activate the third patch context M3 (c.f. step 24). Subsequent to step 24, the processor executes instruction code, which is modified according to the third patch context M3.

Advantageously, in case an interrupt is initiated during sequential code execution the information of the currently active patch context is saved. Thus, the patch context can be restored when returning from the interrupt. An interrupt according to the application may be any event, interrupting the sequential code execution, e.g. a software or hardware interrupt routine or an exception routine. The code within the interrupt routine or exception routine can be treated as sequential code and can comprise any number of patch contexts. Advantageously, if nested interrupt or exception routines are allowed in the firmware, the context information is stored on a stack and restored from the stack in case of returning.

FIG. 4 is an exemplary flow chart illustrating an embodiment of the inventive method with two levels of interrupts. In step 30 the patch context M1 is activated by the instruction "init_patch_context (M1)". Subsequent to step 30, in step 31 the processor executes instruction code, which is modified according to the patch context M1. At the end of step 31 an interrupt is initiated, with the processor stopping current code execution and executing an interrupt routine instead. The function "push_context( )" (c.f. step 32) in the first level interrupt routine pushes a pointer to the currently active context on the top of the stack, here M1. Thus, the context information of the currently active context M1 is saved on the stack. In steps 32 and 33 the patch contexts I1 and I2 are activated one at a time as described according to FIG. 3. At the end of step 34 an interrupt is initiated, with the processor stopping the execution of the first level interrupt routine and executing a second level interrupt routine instead. The function "push_context( )" (c.f. step 35) in the second level interrupt routine pushes a pointer to the currently active context on the stack, here I2. Thus, the context information of the currently active context I2 is saved on the stack. In step 35 of the second level interrupt routine the patch contexts I3 is activated. The function "pop_context( )" in step 36 at the end of the second level interrupt routine pops the patch context pointer from the stack, i.e. removes the patch context on top of the stack, and activates that context, here I2. After returning to the first level interrupt routine, the function "pop_context( )" in step 37 at the end of the first level interrupt routine pops the patch context pointer from the stack and activates that context, here M1. Thus, after returning from the first level interrupt routine the patch context M1, active prior to the interrupt, is active again.

Advantageously, when the system supports multiple parallel threads, each thread can be treated as a sequence of sequential code and can have any number of patch contexts. Before the system switches between two threads, information about the currently active patch context is saved. Thus, this patch context can be restored the next time the corresponding thread is reactivated. The term "thread" according to the application also comprises synonymous terms like "process" and "task".

Figure 5:
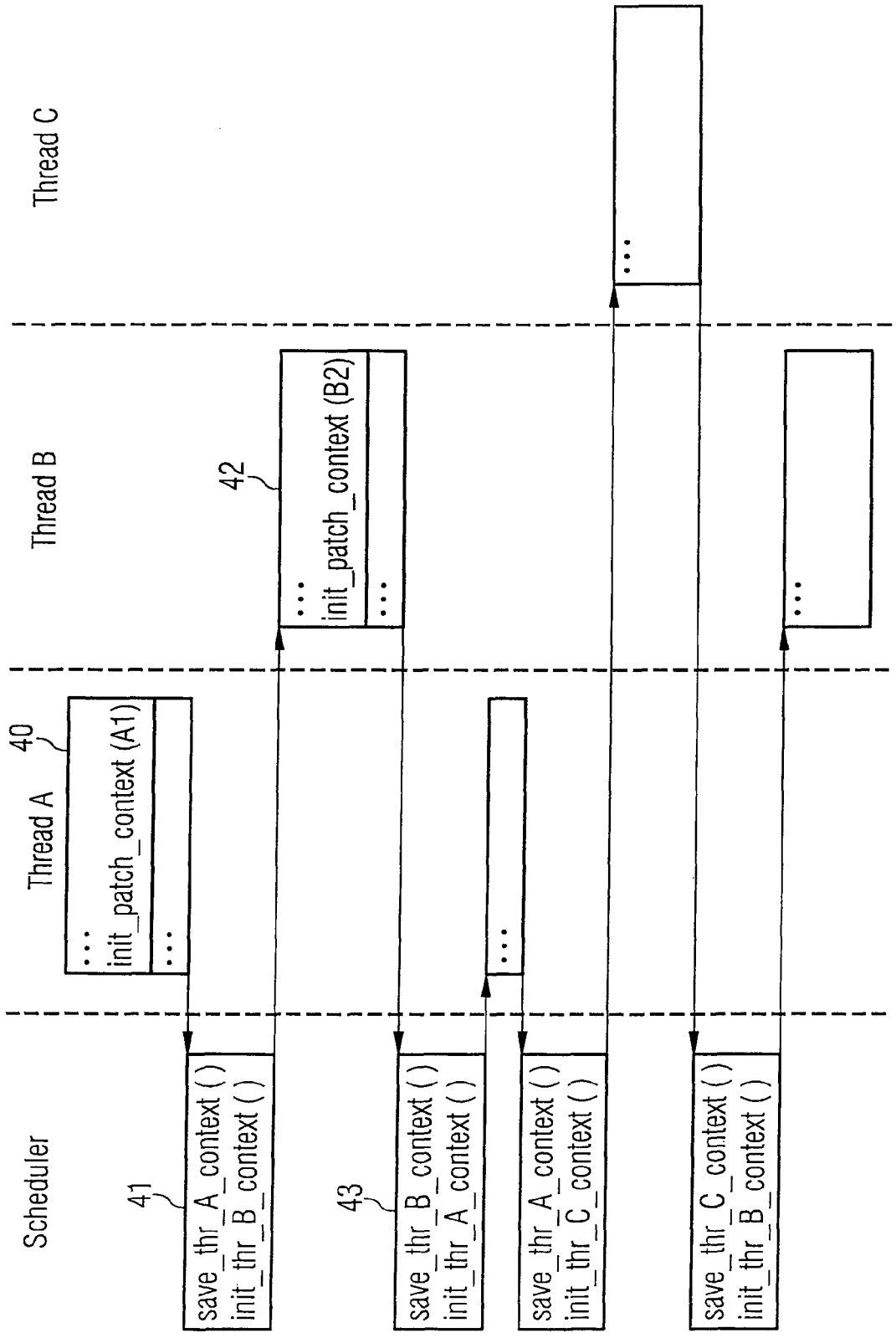
FIG. 5 is an exemplary flow chart illustrating an embodiment of the inventive method in an exemplary case of a thread switching.

FIG. 5 is an exemplary flow chart illustrating another embodiment of the inventive method in an exemplary case where a thread switching is initiated. Initially in step 40 thread A is executed on the processor, with patch context A1 being activated by the instruction "init_patch_context (A1)". When thread B is to be executed, a thread scheduler saves in step 41 the current patch context of thread A, here A1, by means of the instruction "save_thr_A_context( )" and activates a previously saved patch context for thread B ("init_thr_B-context"). During the execution of thread B in step 42, a new patch context B2 is activated by means of the execution "init_patch_context (B2). When thread A is to be executed again, the scheduler saves the active context for thread B in step 43 ("save_thr_B_context( )"), here B2, and initiates the saved patch context for thread A, here A1. After the execution of thread A, the example in FIG. 5 continues with the execution of thread C and afterwards thread B.

According to one embodiment of the invention, patches that have to be active all the time do not need to be put into all successively activated patch contexts. These always active patches are activated once and written to the patch hardware. In case of loading a patch context in the patch hardware afterwards these always active patches are not replaced but remain active in the patch hardware. This set of always active patches forms an always active patch context. Examples for such always active patches are also time critical patches that allow no delay due to context switching.

Advantageously, a so called "empty patch context" can be provided. When activating such empty patch context, no new context is loaded to the patch hardware. Instead the current patch context, activated prior to the empty patch context, remains active. A typical application for such empty patch context is a thread without own patches. In a thread without own patches an empty patch context may be initiated. Thus, no context switching is necessary when this thread is activated.

It should be noted that typically most patch contexts do not use all available patch vectors of the patch hardware. Thus, the effort for copying the patch vectors and patch blocks can be reduced by conserving most information of a context, which allocates each patch vector (or at least most patch vectors). As an example, in case of a patch hardware with N=32 patch vectors initially a context A with 32 vectors is active. Afterwards a context B with 3 vectors is activated. This causes only the first 3 vectors and blocks to be overwritten in the patch hardware with the context B information. If context A is activated again, it is only necessary to copy the first 3 patch vectors and blocks instead of all 32.

While the invention has been illustrated and described with respect to one or more implementations, alterations and/or modifications may be made to the illustrated exam-ples without departing from the spirit and scope of the appended claims. In particular regard to the various functions performed by the above described components or structures (assemblies, devices, circuits, systems, etc.), the terms (including a reference to a "means") used to describe such components are intended to corre-spond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A method for patching a read-only memory, wherein the read-only memory provides information for a data processing system, the method comprising:
    providing multiple patch contexts in a patch contexts memory, wherein each patch context defines a different set of patches, and wherein each patch comprises a patch address and corresponding patch data;
    activating the patch contexts one at a time, wherein at each time the information in a read-only memory that provides information for a data processing system is patched according to the currently activated patch context;
wherein activating a patch context comprises loading a patch context from the patch contexts memory into patch hardware configured to patch the read-only memory according to the loaded patch context, wherein the patch hardware is limited with respect to a number of patches to load therein; and
wherein before switching between two threads, wherein a first thread is deactivated and a second thread is activated, information about a currently activated patch context is saved in the patch contexts memory, and the saved patch context is restored a next time the first thread is reactivated.

2. A data processing system comprising:
    a read-only memory configured to store and provide information for the data processing system;
    a patch contexts memory configured to store and provide multiple patch contexts, wherein each patch context comprises a different set of patches, and wherein each patch comprises a patch address and corresponding patch data; and
    a means for patching the read-only memory, configured to activate the patch contexts one at a time, wherein each time the information being patched according to the currently activated patch context;
wherein the means of patching the read-only memory comprises patch hardware, wherein the patch hardware is configured to load a patch context from the patch contexts memory, and wherein the patch hardware is limited with respect to a number of patches to load, and wherein the patching is performed according to a loaded patch context within the patch hardware, and wherein before switching between two threads, wherein a first thread is deactivated and a second thread is activated, information about a currently activated patch context is saved in the patch contexts memory by the patching means, and the saved patch context is restored a next time the first thread is reactivated.

3. A method for patching a read-only memory, comprising:
   providing a patch contexts memory in which multiple patch contexts are stored, wherein a patch context identifies both an address location in the ROM and corresponding patch data, the patch data differing from initial data stored in the address location in the ROM;
   activating the patch context by loading the patch context from the patch contexts memory into a patch vector register, wherein the patch vector register is limited with respect to a number of patch contexts to load therein;
   after the patch context has been activated, receiving a data request that specifies the address location within the ROM in which the initial data was stored; and
   responding to the data request by returning the corresponding patch data from the patch vector register rather than returning the initial data from the address location in the ROM,
   wherein before switching between two threads, wherein a first thread is deactivated and a second thread is activated, information about a currently activated patch context is saved in the patch contexts memory, and the saved patch context is restored a next time the first thread is reactivated.

* * * * *